(12) United States Patent
Sander et al.

(10) Patent No.: US 9,714,576 B2
(45) Date of Patent: Jul. 25, 2017

(54) RIBLET STRUCTURE ON A FLOW SURFACE AND METHOD

(71) Applicant: AIRBUS OPERATIONS GMBH, Hamburg (DE)

(72) Inventors: Peter Sander, Bremen (DE); Jan Reh, Hamburg (DE)

(73) Assignee: AIRBUS OPERATIONS GMBH, Hamburg (DE)

( * ) Notice: Subject to any disclaimer, the term of this patent is extended or adjusted under 35 U.S.C. 154(b) by 0 days.

(21) Appl. No.: 13/712,674

(22) Filed: Dec. 12, 2012

(65) Prior Publication Data
US 2013/0156595 A1    Jun. 20, 2013

Related U.S. Application Data

(60) Provisional application No. 61/570,392, filed on Dec. 14, 2011.

(30) Foreign Application Priority Data

Dec. 14, 2011   (DE) .................. 10 2011 121 054

(51) Int. Cl.
*B64C 1/38*      (2006.01)
*F01D 5/14*      (2006.01)
*F01D 5/28*      (2006.01)
*F15D 1/00*      (2006.01)

(52) U.S. Cl.
CPC .............. *F01D 5/14* (2013.01); *F01D 5/145* (2013.01); *F01D 5/286* (2013.01); *F05D 2250/61* (2013.01); *F05D 2300/433* (2013.01); *F05D 2300/44* (2013.01); *F05D 2300/702* (2013.01); *F15D 1/0035* (2013.01); *Y02T 50/673* (2013.01)

(58) Field of Classification Search
CPC ..... B64C 21/00; B64C 21/10; B64C 2230/26; B64C 2230/00; F15F 1/0035; F15F 1/003; F15D 1/0045; F15D 1/004
USPC ......... 244/13, 200, 200.1; 156/244.11; 3/13, 3/200, 200.1
See application file for complete search history.

(56) References Cited

U.S. PATENT DOCUMENTS 4,907,765 A * 3/1990 Hirschel et al. ............. 244/200
4,986,496 A * 1/1991 Marentic et al. ............. 244/130
5,069,403 A * 12/1991 Marentic et al. ............. 244/130
(Continued)

FOREIGN PATENT DOCUMENTS

DE        3534293 A1     4/1987
DE    102006004644 A1    8/2007
(Continued)

OTHER PUBLICATIONS

German Patent Office, German Office Action for Application No. 102011121054.0, dated Dec. 12, 2012.
(Continued)

*Primary Examiner* — Philip J Bonzell
(74) *Attorney, Agent, or Firm* — Lorenz & Kopf, LLP

(57) ABSTRACT

A riblet structure for a flow surface is provided. The riblet structure has a multitude of riblets that comprise a matrix material which includes reinforcement elements. The reinforcement elements can be designed as reinforcement fibers that extend in the longitudinal direction or as particles. In this manner the abrasion resistance can be improved and erosion can be retarded.

6 Claims, 2 Drawing Sheets

(56) References Cited

U.S. PATENT DOCUMENTS

| | | | | |
|---|---|---|---|---|
| 5,132,394 | A | * | 7/1992 | Bockrath ............... 528/353 |
| 5,133,516 | A | * | 7/1992 | Marentic et al. .......... 244/130 |
| 5,238,638 | A | * | 8/1993 | Isayev ............... B32B 7/02 |
| | | | | 264/109 |
| 5,268,225 | A | * | 12/1993 | Isayev ............... B32B 7/02 |
| | | | | 264/108 |
| 5,582,670 | A | * | 12/1996 | Andersen et al. .......... 156/242 |
| 5,848,769 | A | * | 12/1998 | Fronek et al. ............ 244/200 |
| 5,971,326 | A | | 10/1999 | Bechert |
| 6,838,162 | B1 | * | 1/2005 | Gruber et al. ........... 428/293.4 |
| 7,041,363 | B2 | * | 5/2006 | Krohmer et al. .......... 428/209 |
| 7,070,850 | B2 | * | 7/2006 | Dietz et al. ............ 428/172 |
| 7,736,570 | B2 | | 6/2010 | Stenzel et al. |
| 2005/0074993 | A1 | * | 4/2005 | Alam .................. H01M 4/137 |
| | | | | 439/91 |
| 2010/0080958 | A1 | | 4/2010 | Goelling |
| 2011/0186685 | A1 | * | 8/2011 | Tsotsis et al. ........... 244/130 |

FOREIGN PATENT DOCUMENTS

| | | |
|---|---|---|
| DE | 60314775 T2 | 4/2008 |
| DE | 102008042237 A1 | 4/2010 |
| EP | 0920378 B1 | 3/2004 |
| WO | 2010088423 A2 | 8/2010 |
| WO | 2010088424 A2 | 8/2010 |
| WO | 2010088425 A2 | 8/2010 |
| WO | 2011037716 A2 | 3/2011 |
| WO | 2011037719 A2 | 3/2011 |
| WO | 2011097001 A1 | 8/2011 |
| WO | 2012104078 A1 | 8/2012 |

OTHER PUBLICATIONS

German Patent Office, German Office Action for German Patent Application No. 10 2011 121 054.0 mailed Nov. 6, 2015.

* cited by examiner

RIBLET STRUCTURE ON A FLOW SURFACE AND METHOD

CROSS-REFERENCE TO RELATED APPLICATIONS

This application claims priority to German Patent Application No. 10 2011 121 054.0, filed Dec. 14, 2011 and to U.S. Provisional Patent Application No. 61/570,392, filed Dec. 14, 2011, which are each incorporated herein by reference in their entirety.

TECHNICAL FIELD

The technical field relates to a riblet structure for a flow surface, to a method for manufacturing a riblet structure and to the use of reinforcement elements in riblets on a flow surface.

BACKGROUND

The term "riblets" refers to profile bodies on surfaces that are implemented as an arrangement of microscopic grooves or riblets. The use of riblets on flow surfaces of vehicles serves to reduce the flow resistance and thus to reduce fuel consumption.

Various methods are known in the manufacture of riblets. It is possible to bond profiled foils onto a flow surface, a paint on the flow surface can be profiled by means of a laser ablation method to form riblets or riblets can be formed by selective application of a curable coating material by means of an application device guided on the flow surface.

In particular in the use of riblets on aircraft surfaces, experience has shown that because of the continuous flow around the riblets, said riblets erode and over time become flatter or may become completely worn off. Frequently, any reworking of riblets is possible only by replacement of a profiled riblet foil, by restoring an eroded surface by means of a laser ablation method, or by completely removing a profiled coating material and applying a new one.

DE 196 50 439 C9 shows forms of riblets for a flow surface of a vehicle. In addition, other objects, desirable features and characteristics will become apparent from the subsequent summary and detailed description, and the appended claims, taken in conjunction with the accompanying drawings and this background.

SUMMARY

To prevent time-consuming and cost-intensive rework in order to renew or refresh a profiled surface it is desirable to reduce the abrasion, or the susceptibility to erosion, of the riblets. It may thus be desirable to provide an abrasion-resistant riblet structure on a flow surface and a method for producing an abrasion-resistant riblet structure.

According to various exemplary embodiments, a riblet structure has a multitude of riblets that comprise a matrix material that encloses reinforcement elements.

In this exemplary embodiment, the riblets form a number of elevations on a flat base, which elevations result in the desired groove structure that reduces the flow resistance. In order to increase the abrasion resistance, reinforcement elements are enclosed in a matrix material; they are used to absorb, in one example, shear forces that would result in the lifting of the matrix material. The abrasion resistance is therefore considerably greater when compared to conventional riblets. A positive side-effect comprises the clearly improved rigidity of the riblets, which makes it possible to produce sharper-edged contours and delimitation edges that result in a riblet structure with a high savings effect. In order to achieve advantageous aerodynamic characteristics, riblets should have as small a lateral extension as possible, because in experimental trials, in one example, very narrow wall-like or web-like riblets have been shown to be clearly more advantageous than saw-tooth-shaped riblets. Due to the erosion that can be observed in reality, in the state of the art very narrow riblets have, however, hardly been achievable, in practical use, in a permanent manner. With the use of reinforcement elements it is, however, possible, at least in some regions, to delimit the lateral extension of the riblets without causing greater erosion.

Furthermore, there is no longer any need for transition regions that extend across the direction of flow, and, in contrast to a riblet without reinforcement fibers or other reinforcement elements on a foil, significantly better adhesion to the flow surface can be achieved.

In one exemplary embodiment, the riblets in each case comprise a longitudinal direction, and the reinforcement elements are designed as reinforcement fibers that extend in the longitudinal direction. Accordingly, the riblets comprise a main direction of extension that is to be interpreted as a longitudinal direction. It makes sense to use reinforcement fibers that extend in this direction in order to achieve good distribution of the reinforcement elements within the riblets. In the production of the riblet structure by means of an extrusion method it is necessary to introduce the reinforcement fibers in a directional manner into the flow of the matrix material during extrusion prior to the matrix material issuing from the extrusion nozzle.

Reinforcement fibers can be implemented in the form of carbon fibers, glass fibers, fibers comprising metallic materials, fibers comprising ceramic materials, aramide fibers or other known materials.

In one exemplary embodiment, the at least one reinforcement fiber in each case is designed as a fiber bundle or as several fiber bundles. In this manner it is possible to significantly improve both the abrasion resistance and the stiffness, which results in reduced erosion and a possibility of implementing riblets with a significantly thinner design. With the use of short fibers, for example for the riblets that in each case are arranged so as to be spaced apart from each other, during extrusion it would be possible to place individual loose strands, in one example, of combed fibers that are parallel to each other or carded fibers, into the flow of the matrix material.

If at all possible the reinforcement fibers should not have too long a longitudinal extension because otherwise the riblets would take up tensile forces, which may result in the riblets becoming detached from the flow surface. In one example, with the use of the riblet structure on flow surfaces of an aircraft with an elongated fuselage, the significant deformation that occurs in the fuselage, in one example, during takeoff and landing, may not be followed by the reinforcement fibers without the riblet structure becoming detached from the flow surface, the reinforcement fibers tearing or becoming detached from the matrix, and the riblet structure fraying. With the use of short fibers, for example in the form of rovings, this can reliably be prevented. As an alternative, the reinforcement elements can also be designed in the form of hybrid rovings that comprise different materials and that have been grouped to form fiber bundles. In this manner the abrasion-resistant characteristics of the riblets can be optimized at the same time for different load scenarios.

In one exemplary embodiment, the reinforcement elements are designed as reinforcement particles. In order to improve the abrasion resistance of riblets, apart from the use of reinforcement fibers particle-shaped reinforcement elements suggest themselves, which can be of various designs. The particles can be designed as platelets comprising a flat and substantially planar shape, which platelets are significantly shorter and wider than reinforcement fibers. In this arrangement the width of the platelets is delimited by the size of the riblets, and consequently the width of such platelets is significantly less than the height of the riblets; for example half the height of the riblets or less.

Furthermore, reinforcement elements in the form of particles are also imaginable, which reinforcement elements substantially extend in all three spatial directions and rather resemble a spherical shape than a planar flat shape. Such particles can, for example, range from about 1 to about 90 μm or greater in size with the particles being embedded in the matrix material in order to improve abrasion resistance. Generally-speaking, the particles can, for example, comprise corundum.

In one exemplary embodiment, the matrix material is a curable resin. Generally-speaking, the riblet structure comprises a matrix material in which reinforcement elements have previously been incorporated. Correspondingly, in one example, an extrusion method is suitable to produce the riblet structure. An initially liquid, viscous or paste-like matrix material can be brought to a predetermined shape by means of an extrusion nozzle, wherein the reinforcement elements embedded in the matrix material can be fully enclosed in the corresponding riblets. The curable resin can, for example, be a heat-treatable resin, i.e. a thermosetting material, which is also known in the form of paints.

In one exemplary embodiment, a thermoplastic material is used as a matrix material. In the selection of the thermoplastic it should be taken into account that, for example, aircraft with a dark surface comprising a thermoplastic material are subjected to considerable surface temperatures in generally hot locations with strong solar radiation. At such surface temperatures experienced, for example of about 80° C., the thermoplastic material must not become soft to such an extent that the basic riblet structure is changed. It should also be noted that with the use of a riblet structure in aircraft, in one example, at takeoff the still considerably heated riblet structure may be subject to strong flow that would deform a thermoplastic material that is possibly too soft.

In one exemplary embodiment, a thermoplastic matrix material is used that is selected from a group of thermoplastic matrix materials, with the group comprising: polyamides (PA), polyether imides (PEI), polyetherketones (PEEK), polyphenylene sulfides (PPS), polyether sulfones (PES), polysulfones (PSU) and polyphthalamides (PPA). By selecting a suitable thermoplastic material or several materials at different regions to be coated, high reliability of the riblets can be provided.

The corresponding material selection, whether thermosetting materials or thermoplastic materials, depends on the particular use of the riblet structure. With the use of a curable resin it should be taken into account that the riblet structure produced with it may not be completely resistant to erosion. While abrasion of the riblets takes significantly longer than in the case of known riblets, during use the need for removing or exchanging the riblets may nevertheless occur. However, removing a cured resin is not quite as easy to achieve as is removing a thermoplastic material, which becomes soft or even liquid with the application of heat, and can thus easily be removed from the flow surface. In contrast to this, thermoplastic materials cannot be used without restrictions in vehicle construction, because certain repair work on the vehicle is in part carried out with the use of locally higher temperatures, which would destroy a riblet structure.

In one exemplary embodiment the riblets comprise a tapering shape wherein each riblet is defined by two lateral surfaces and a root, wherein the lateral surfaces, starting from the root arranged on a base of the riblet structure, extend to a common tip. Apart from providing an inclination that is substantially constant to the tip, it may also make sense for the inclination of the lateral areas to rise. In this manner at the same time quite a wide and mechanically better loadable root of a riblet can be provided, and at the same time also a width that more quickly narrows towards the tip than in a pure triangular shape. With the use of reinforcement elements that reduce the abrasion of the riblets, a sharper contour selected in this manner can be selected, which contour is closer to the known theoretical optimum in the form of web-like planar riblets, while at the same time also providing reduced susceptibility to erosion. The tip angle and/or an end radius of the tip, which end radius is due to the production process, should be as small as possible.

In one exemplary embodiment, the riblets at the base are spaced apart from each other. In one example, in conjunction with the rising gradient towards the tip of the riblets, spacing apart is generally sensible in order to achieve approximation to the technical optimum with web-like narrow riblets.

The present disclosure further relates to a method for producing a riblet structure for a flow surface, wherein the following method can be carried out. At first reinforcement elements are added to the matrix material. This can be carried out by mixing the reinforcement elements with the matrix material wherein homogeneous distribution must be achieved. If reinforcement fibers are used, it is generally favorable to introduce them in a directional manner into the flow of the matrix material directly during the extrusion process immediately prior to the matrix material issuing from the extrusion nozzle. Subsequently a riblet mat is extruded, for example by conveying the matrix material through an extrusion nozzle, wherein at the top of the riblet structure riblets extend in the direction of extrusion, and the reinforcement elements are situated within the riblets. The extrusion nozzle necessary for extrusion can be designed as a wide slot nozzle with notches that comprise the desired final shape. Subsequently the riblet mat is applied to a substrate surface against the direction of extrusion, wherein the underside of the riblet mat adheres to the substrate surface. With extrusion techniques, practically any type of riblets can be produced that comprise at least two lateral surfaces that converge in a predetermined manner to form a peak or some other end.

In one exemplary embodiment the substrate surface can be a flow surface. This results in an extrusion nozzle having to be guided along the flow surface to be coated in order to continuously apply riblets to said surface. In this variant it is possible, in one example, to coat larger, flat substrate surfaces.

In one exemplary embodiment, the substrate surface is an adhesive foil. This makes possible the production on an industrial scale, supported by simple processing of a completely planar and horizontally held or guided foil; subsequently making it possible to easily apply said foil to curved surfaces and prevents damage to the flow surface when applying riblets without a foil.

In one exemplary embodiment an extrusion nozzle is used from which riblets can be extruded that extend so as to be parallel to each other. In this arrangement the riblets can either be profiled in such a manner that they adjoin each other in a seamless manner or that they are spaced apart from each other.

A person skilled in the art can gather other characteristics and advantages of the disclosure from the following description of exemplary embodiments that refers to the attached drawings, wherein the described exemplary embodiments should not be interpreted in a restrictive sense.

BRIEF DESCRIPTION OF THE DRAWINGS

The various embodiments will hereinafter be described in conjunction with the following drawing figures, wherein like numerals denote like elements, and wherein.

DETAILED DESCRIPTION

The following detailed description is merely exemplary in nature and is not intended to limit the present disclosure or the application and uses of the present disclosure. Furthermore, there is no intention to be bound by any theory presented in the preceding background or the following detailed description.

Figure 1A:
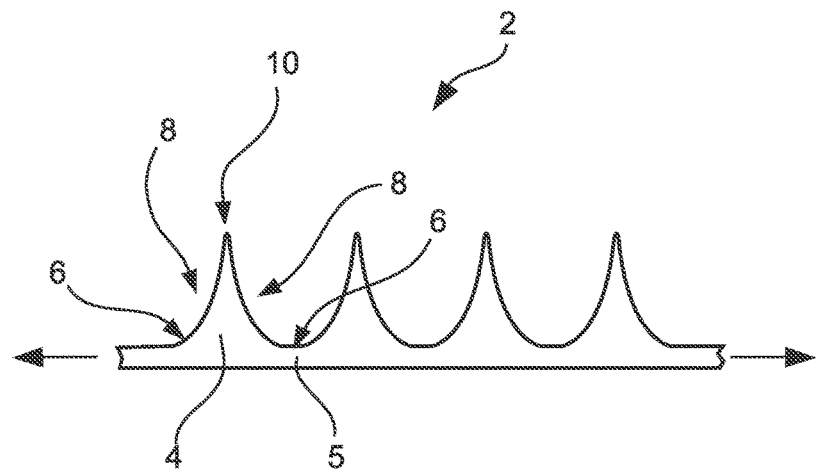
FIG. 1A and FIG. 1B show a diagrammatic view of the riblet structure with reinforcement elements (FIG. 1A) and without (FIG. 1B) reinforcement elements.

FIG. 1A shows an exemplary embodiment of a riblet structure 2 with a multitude of riblets 4 that are arranged so as to be parallel to each other on a base 5, which riblets 4 in each case comprise a root 6 and two lateral surfaces 8 that extend from the root 6 to a common tip 10. The slope of the lateral surfaces 8 can be constant or rising. A theoretical optimum comprises the use of planar, flat, web-like riblets that extend from the base 5 so as to be substantially perpendicular. However, this is unlikely to be achievable because the material thickness of such riblets would be so thin that excessive erosion would occur. It is thus aimed to provide the lateral surfaces 8 with a slope so that the root 6 provides adequate stability, while the shape of the riblets 4 overall is, however, as narrow as possible. The form shown corresponds to an extrusion profile of an extrusion nozzle. Movement of the extrusion nozzle results in a multitude of riblets 4 that are parallel to each other. In this arrangement the direction of movement of the extrusion nozzle determines the longitudinal direction of the riblets, which longitudinal direction extends so as to be perpendicular, or substantially perpendicular, to the drawing plane in FIG. 1A and FIG. 1B.

Approximation to the theoretical optimum can be improved in that the riblets 4 are spaced apart from each other and comprise empty spaces 12. Producing the riblets 4 can be achieved with the use of an extrusion nozzle that comprises a flat, wide, slot-like outflow cross section that comprises jagged notches for producing riblets 4. The shape of the notches is directly responsible for the resulting shape of the lateral surfaces 8. In a preferred embodiment, the riblets 4 are substantially parabolic in shape as shown in FIGS. 1A and 1B.

Figure 1B:
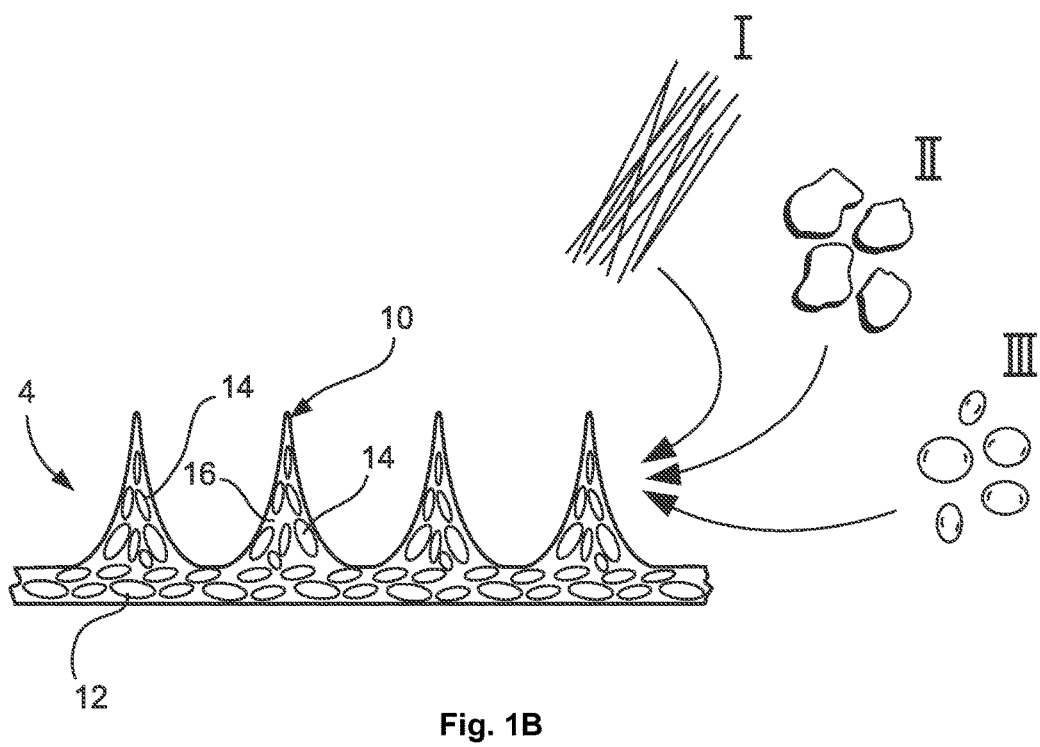

FIG. 1B shows the structure with visible reinforcement elements 14. The riblets 4 comprise a matrix material 16 in which the reinforcement elements 14 are fully embedded. The reinforcement elements 14 are used to provide the riblets 4 with abrasion resistance. Erosion of the riblets 4 is significantly reduced as a result of this, and, furthermore, substantially sharp contouring of the lateral surfaces 6 is made possible.

Possible reinforcement elements 14 include fibers (I) in the form of short-fiber rovings comprising one or several fiber materials, platelet-shaped reinforcement elements (II) and particle-shaped reinforcement elements (III). Reinforcement elements 14 are added to the matrix material 16 prior to extrusion, and consequently the extrusion process ensures that all the regions of the riblets 4 comprise reinforcement elements. As explained above, directionally aligned insertion of fibers just prior to the extrusion process ensures that the fibers extend in the longitudinal direction of the riblets.

Figure 2:
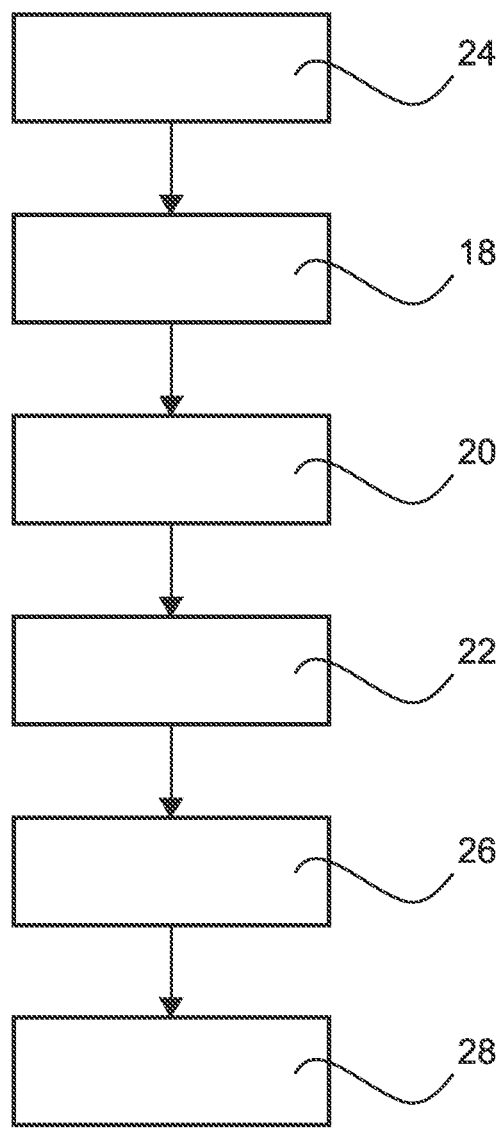
FIG. 2 shows a diagrammatic block-based view of a method for producing a riblet structure.

FIG. 2 shows a method according to the present disclosure for producing riblets. First, reinforcement elements are added 18 to a matrix material, subsequently the riblet structure is extruded 20, by way of an extrusion nozzle, onto a substrate surface, wherein the extrusion nozzle is moved 22 against the direction of extrusion relative to the substrate surface. In one variant, heating 24 the matrix material 20 can be carried out prior to extruding; in another variant, curing 26 can take place after the extrusion process. If the matrix material is a thermoplastic material, it is necessary to heat it prior to extrusion, while in the case of resins, e.g. melamine resin or other types of resin, subsequent curing is required. Finally, extrusion can also take place onto an adhesive foil, after which the adhesive foil is bonded 28 onto the flow surface to be coated.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the present disclosure in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the present disclosure as set forth in the appended claims and their legal equivalents.

The invention claimed is:

1. A method for producing a riblet structure for a flow surface, comprising:
   adding directionally aligned reinforcement elements into a matrix material immediately prior to extrusion;
   extruding a riblet mat such that at the top of the riblet structure riblets extend in the direction of extrusion, and the reinforcement elements are situated at least in the core of the riblets;
   wherein the riblets in each case have a longitudinal direction with a substantially parabolic cross-section, and the reinforcement elements are reinforcement fibers that extend in the longitudinal direction;
   wherein the reinforcement fibres are added to the matrix material immediately prior to extrusion of the riblets;
   and applying the riblet mat to a substrate surface against the direction of extrusion, wherein the underside of the riblet mat adheres to the substrate surface.

2. The method of claim 1, wherein the substrate surface is a flow surface.

3. The method of claim 1, wherein the substrate surface is an adhesive foil.

4. The method of claim 1 comprising forming a number of elevations on a flat base.

5. The method of claim 1 comprising enclosing reinforcement elements in a matrix material.

6. The method of claim 5 comprising absorbing shear forces in the reinforcement elements.

* * * * *